Patented July 8, 1941

2,248,105

UNITED STATES PATENT OFFICE 2,248,105

PLASTIC COMPOSITION

Orville V. McGrew, Chicago, Ill.

No Drawing. Application January 4, 1937,
Serial No. 118,993

7 Claims. (Cl. 106—31)

This invention is a plastic composition and is fully described herein. It is principally employed to form an underlayer for floors, being laid on the major floor support which may be concrete, rough wood, or metal, and supporting the floor finish which may be linoleum, wood or any of the compositions commonly used. It is highly effective as a deadener, a sound-proofing agent and a heat insulator.

The composition is largely composed of coarsely granular cork bonded with cut-back asphalt and strengthened by relatively long fibres of considerable tensile strength.

In preparing the composition there is first made up what has been termed a glue base consisting of 45% Mid-Continent asphalt, 14% gilsonite, (melting point 275–280 F.), and 41% V. M. & P. (varnish makers' and painters' naphtha).

The Mid-Continent asphalt is made from what is called Mid-Continent flux oil having an A. P. I. gravity at 60° F. of 8.5, flash 630° F., Engler viscosity at 210°, 130, Engler viscosity at 300°, 11.0, Engler viscosity at 350° F., 4.9. The flux oil has a melting point of 93° F. and an asphalt content of 41.9%.

The foregoing figures are for identification only and can naturally be varied considerably.

This selected flux oil is blown to a maximum temperature of 550° F. for approximately two hours. The gilsonite is then added and blowing continued at approximately the same temperature until a melting point of 200 and a penetration of 14 are obtained. The asphalt is then cooled to 300° and the naphtha is added. The naphtha will be varied to produce a viscosity of approximately 60 for winter temperatures and 100 for summer temperatures.

In preparing the composition I mix thoroughly together 108 gallons of the glue base above described, 465 pounds of ¼" cork, 11 gallons of water containing in solution 5 ounces of chromic acid, and 11 pounds of 2" sisal. The proportions are such that the individual cork particles are thoroughly coated but the voids are left substantially unfilled, so that after the naphtha has evaporated the mass is nearly as porous as would be a mass of the dry cork granules in an equal space. The granules, of course, are entirely irregular and by the coating are bonded together at their points of contact.

The composition is quite dry when first made and in use is merely spread about on the floor and smoothed off to a fairly level surface. After a short time the naphtha evaporates and the layer becomes fairly solid. The upper surfacing layer is then cemented on in any usual way.

The composition possesses distinctly novel characteristics. The cork particles together with the air spaces between them supply practically the entire bulk to the composition. The glue base, after the V. M. & P. has evaporated, is of a character which is distinctly rubbery and which, having a low temperature susceptibility has this yielding character under all conditions. The cork particles are thus enabled to spring in their natural manner and the binder is sufficiently rubbery to permit this yield and to follow the compression and expansion of the cork particles so as not materially to impair their natural springiness. The sisal fibre operates to interlock the particles so as to prevent substantial rearrangement and consequent settling of the floor as the particles spring in use.

As a result it is possible so to support a layer of flooring as to give it considerable elasticity without any tendency of the under-layer to disintegrate, settle and produce irregularities. The fact that the composition has its bulk principally supplied by cork and interstitial air cells, renders the composition an excellent heat insulator and the cork retains its sound deadening properties. Furthermore, the elasticity of a layer of the composition is such that a foot-fall or the like on the floor above it is very substantially cushioned so that the support underneath the composition layer receives no shock such as would produce a sound in the apartment below.

What I claim as new, and desire to secure by Letters Patent, is:

1. The herein described composition, the main bulk of which is supplied by coarsely granular cork particles coated with a permanently flexible binder uniting the particles at their points of contact and leaving the natural interstices between the cork particles substantially open, the binder being such as to permit the cork particles to be compressed and expand freely.

2. The herein described composition, the main bulk of which is supplied by coarsely granular cork particles coated with a permanently flexible binder uniting the particles at their points of contact and leaving the natural interstices between the cork particles substantially open, the binder being such as to permit the cork particles to be compressed and expand freely, the composition containing a substantial proportion of long fibres operating to interlock the particles and hold them in position.

3. The herein described composition composed of the following ingredients in the proportions shown, to wit: 465 pounds ¼" cork, and approximately 108 gals. of a glue base comprising a cut back asphalt binder of which the asphaltic ingredient is about one part gilsonite to three parts air blown Mid Continent asphalt with a melting point of approximately 200° F., the cut back asphalt being used in quantity sufficient to coat the cork particles and after evaporation of the solvent to leave the interstices between the cork particles substantially open.

4. The herein described composition composed of the following ingredients in the proportions shown, to wit: 465 pounds ¼" cork, and a cut back asphalt binder of which the asphaltic ingredient is about one part gilsonite to three parts air blown Mid-Continent asphalt with a melting point of approximately 200° F., the cut back asphalt being used in quantity sufficient to coat the cork particles and after evaporation of the solvent to leave the interstices between the cork particles substantially open, the composition also including a substantial percentage of long fibres which interlock the cork particles and hold them in place.

5. The method of forming a composition of great resilience which comprises coating coarsely granular cork particles with a permanently flexible binder dissolved in a solvent, and then evaporating the solvent to leave the interstices between the cork particles substantially open.

6. The method as set forth in claim 5 in which the binder is principally composed of air blown asphalt and gilsonite.

7. A product as described in claim 3, in which the asphalt binder is employed in the ratio of about 108 gallons to 465 pounds of ¼ inch cork.

ORVILLE V. McGREW.